(12) United States Patent
Naruse et al.

(10) Patent No.: US 6,678,972 B2
(45) Date of Patent: Jan. 20, 2004

(54) HYBRID CONSTRUCTION EQUIPMENT

(75) Inventors: Masami Naruse, Hirakata (JP);
Masatake Tamaru, Tatsunokuchi-machi (JP); Kenzo Kimoto, Hirakata (JP)

(73) Assignee: Komatsu Ltd. (JP)

( * ) Notice: Subject to any disclaimer, the term of this patent is extended or adjusted under 35 U.S.C. 154(b) by 15 days.

(21) Appl. No.: 10/042,242

(22) Filed: Jan. 11, 2002

(65) Prior Publication Data

US 2002/0104239 A1 Aug. 8, 2002

(30) Foreign Application Priority Data

Feb. 6, 2001 (JP) ........................................ 2001-029388

(51) Int. Cl.[7] ................................................. E02F 9/00
(52) U.S. Cl. ......................................................... 37/466
(58) Field of Search .......................... 37/348, 347, 466, 37/902, 414, 415, 416, 234; 701/50; 172/2

(56) References Cited

U.S. PATENT DOCUMENTS

| | | | | |
|---|---|---|---|---|
| 4,719,361 A | * | 1/1988 | Brubaker | 290/45 |
| 4,947,657 A | * | 8/1990 | Kalmbach | 62/239 |
| 6,308,639 B1 | * | 10/2001 | Donnelly et al. | 105/50 |
| 2001/0011050 A1 | * | 8/2001 | Yamaguchi et al. | 477/3 |
| 2002/0100447 A1 | * | 8/2002 | Biess | 123/142.5 R |

FOREIGN PATENT DOCUMENTS

JP   P2000-226183 A   8/2000

* cited by examiner

Primary Examiner—Christopher J. Novosad
(74) Attorney, Agent, or Firm—Rader, Fishman & Grauer PLLC

(57) ABSTRACT

A hybrid construction equipment capable of sufficiently exhibiting performance of a battery with strategic arrangement of the apparatuses being carried out is provided. For this purpose, the hybrid construction equipment includes, on an upper revolving superstructure (10) rotatably placed on a lower traveling unit, an engine (1), a generator (3) driven by the engine (1), a battery (5) charged with electric power generated by the generator (3), an electric motor (7) driven by electric power of the battery (5), an inverter (6) for controlling drive of the electric motor (7) and a driver's cab (12), and the battery (5) is placed to be isolated from the engine (1) and the generator (3).

11 Claims, 5 Drawing Sheets

HYBRID CONSTRUCTION EQUIPMENT

TECHNICAL FIELD

The present invention relates to hybrid construction equipment.

BACKGROUND ART

Recently, following an increase in construction operations in city areas, various arts of improving operation environments such as exhaust gas and noise of construction equipment are proposed. For example, Japanese Patent Application Laid-open No. 2000-226183 discloses an art regarding a hybrid type of working vehicle.

Specifically, as shown in FIG. 7, electric power generated by a generator 52 driven with an engine 51 as a power source is charged to a battery 54 via a battery charger 53, and an electric motor 56 is driven via an inverter 55 by charged electric power to drive a hydraulic pump 57 for driving an working machine. Further, a hydraulic pump 59 driven by the engine 51 via a clutch 58 is included. By switching a working machine driving mode, drive of the hydraulic pumps 57 and 59 is switched to "battery drive", "engine drive", and "engine drive and assist drive by battery" to realize noise reduction according to an operation content and an operation site.

Further, in order to perform operations in city areas, construction equipment needs to have a compact outside shape, and therefore each device mounted thereon is required to be compact. As a large-capacity battery for hybrid construction equipment conventionally requiring a large volume, a battery excellent in input-output characteristics (for example, a lithium ion cell, a nickel-hydrogen fuel cell and the like) is considered to be adopted. Since this kind of battery is susceptible to temperature, the temperature control for the battery is very tight in order to exhibit the performance, and a battery controller attached to the battery controls charge and discharge of electricity by always monitoring voltage, electric current, temperature and the like of the battery.

However, in the conventional hybrid construction equipment, a battery is installed near heating units such as an engine, a hydraulic apparatus and the like, and no consideration is given to installation method and installation place for performing temperature control of the battery, whereby there arises the disadvantage that it does not have the constitution in which the performance of the battery is sufficiently exhibited.

SUMMARY OF THE INVENTION

The present invention is made in view of the above-described disadvantage, and its object is to provide hybrid construction equipment capable of sufficiently exhibiting performance of a battery by carrying out strategic arrangement of apparatuses and temperature control of the battery.

In order to attain the above-described object, hybrid construction equipment according to the present invention includes, on an upper revolving superstructure rotatably placed on a lower traveling unit, an engine, a generator driven by the engine, a battery charged with generated electric power by the generator, an electric motor driven by electric power of the battery, an inverter for controlling drive of the electric motor, and a driver's cab, and the battery is placed to be isolated from the engine and the generator.

According to the above constitution, the battery is placed to be isolated from the heating units such as the engine and the like, and therefore the battery hardly has high temperature. Consequently, reduction in performance and life of the battery caused by the high temperature of the battery can be prevented, and the performance of the battery can be sufficiently exhibited.

Further, in the hybrid construction equipment, the battery is placed inside an upper revolving superstructure frame under the driver's cab. Furthermore, in the hybrid construction equipment, the engine, the generator and a fuel tank are placed in a machine room at a rear part of the upper revolving superstructure, and a working fluid tank and an operation valve for operating a hydraulic pump driven by the engine are placed at a right side of a front part of the upper revolving superstructure.

According to the above constitution, the battery is placed in the frame of the upper revolving superstructure under the driver's cab, which is the place without the heating units around it, and therefore the battery hardly has high temperature, thus making it possible to sufficiently exhibit the performance of the battery. Further, since the fuel tank is placed near the engine and the working fluid tank is placed near the operation valve, the fuel pipe line and the drain pipe line can be shortened, thus making it possible to facilitate the assembly and reduce the system in size.

Furthermore, in the hybrid construction equipment, a battery housing chamber, which includes a cooling air inlet port communicating with the driver's cab and a cooling air outlet port, is provided inside an upper revolving superstructure frame under the driver's cab, and the battery is housed in the battery housing chamber.

According to the above constitution, the battery housing chamber is provided inside the upper revolving superstructure frame under the driver's cab, which is the place isolated from the heating units such as the engine and the like, and this battery housing chamber further includes the cooling air inlet port communicating with the driver's cab and the cooling air outlet port. Consequently, it is made possible to introduce cooling air and control the temperature of the battery at suitable temperature, and thus the performance of the battery can be exhibited more sufficiently.

Further, in the hybrid construction equipment, the inverter is housed in any one of "an air intake chamber communicating with a radiator", "an inverter housing chamber provided at a rear part of the driver's cab", and "a battery housing chamber".

According to the above constitution, the inverter susceptible to high temperature as the battery is housed in the air intake chamber, the inverter housing chamber, or the battery housing chamber, which is isolated from the heating units such as the engine and the like, and therefore the inverter hardly has high temperature. Further, the inverter can be cooled by the engine cooling air, the driver's cab cooling air, or the battery cooling air, thus making it possible to maintain the inverter at suitable temperature and sufficiently exhibit the performance of the inverter. Furthermore, since the battery and the inverter are placed around the driver's cab, the wiring connecting each other is shortened and the assembly is facilitated.

BEST MODE FOR CARRYING OUT THE INVENTION

Preferred embodiments according to the present invention will be explained in detail below with reference to the drawings.

Figure 1:
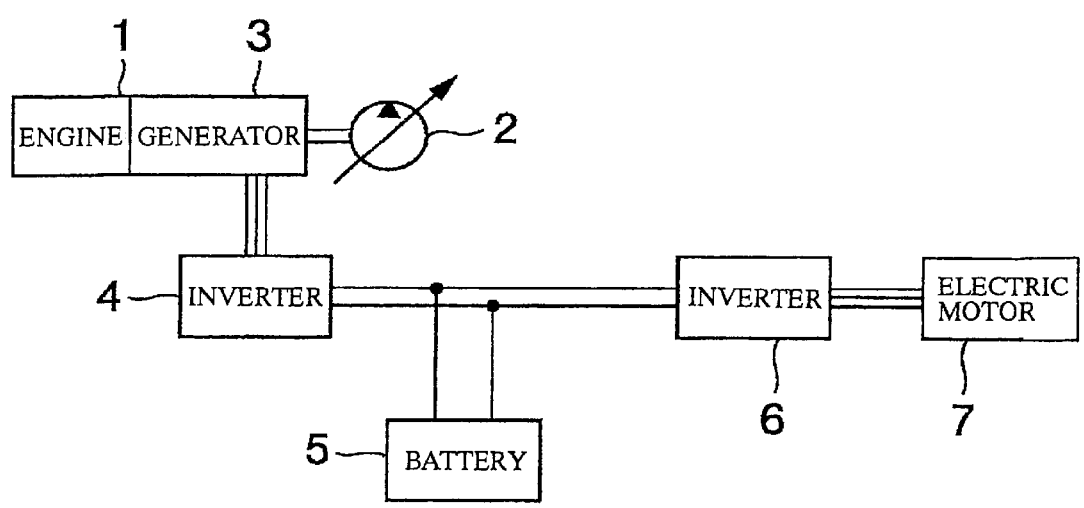
FIG. 1 is a block diagram of an essential part of a hybrid system of a hydraulic shovel according to a first embodiment of the present invention.
Figure 2:
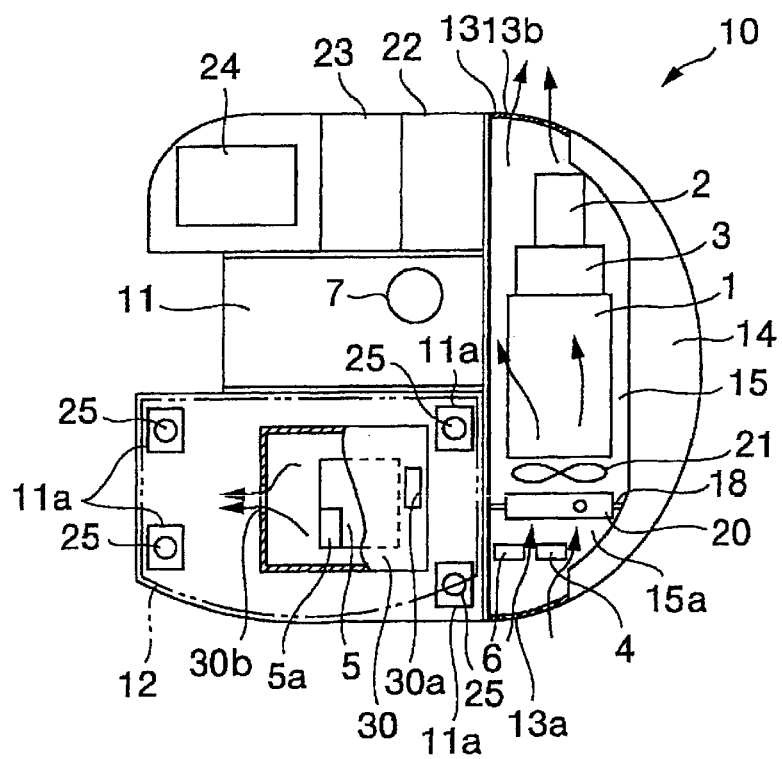
FIG. 2 is a plan view showing apparatus arrangement of a hydraulic shovel according to the first embodiment.

First of all, a first embodiment will be explained with reference to FIG. 1 through FIG. 3. FIG. 1 is a block diagram of an essential part of a hybrid system of a hydraulic shovel in the first embodiment. A generator 3 integrated with a flywheel is connected to a portion between an engine 1 and a variable displacement type of hydraulic pump 2 driven by the engine 1. The generator 3 that is also operated as an electric motor is connected to a lithium ion battery 5 (hereinafter called the battery 5) via an inverter 4. Further, the battery 5 is connected to an electric motor 7 for revolution via an inverter 6.

The engine 1 during operation is driven at rated revolution and drives the hydraulic pump 2. Pressure oil discharged from the hydraulic pump 2 is supplied to an oil pressure actuator (not shown) driving a working machine of the hydraulic shovel via an oil pressure circuit (not shown) including an operation valve 24 (see FIG. 2) to drive the working machine. When a load exerted on the working machine is small and absorption torque of the hydraulic pump 2 is smaller than output torque of the engine 1, the inverter 4 controls drive of the generator 3 by the surplus torque of the engine 1 to generate electric power and charge the battery 5. The inverter 6 controls drive of the electric motor 7 for revolution by the charged electric power.

On the other hand, when a load exerted on the working machine becomes large and the absorption torque of the hydraulic pump 2 becomes larger than the output torque of the engine 1, the inverter 4 controls the drive of the generator 3 as a generator receiving supply of the electric power from the battery 5 to generate an insufficient amount of torque and assist the engine 1. Further, the inverter 6 rotationally drives the electric motor 7 by kinetic energy of an upper revolving superstructure 10 at the time of braking of revolution to make it generate electric power and charge the battery 5. This is called "energy regeneration at the time of braking of revolution".

With use of FIG. 2 and FIG. 3, placement of each device will be explained. The upper revolving superstructure 10 is placed on a lower traveling unit (not shown) to be revolvable as in ordinary hydraulic shovels. The upper revolving superstructure frame 11 (hereinafter, called the revolving frame 11) is provided at a lower part of the upper revolving superstructure 10. On the revolving frame 11, a driver's cab 12 is mounted at a left side of a front part (the lower side of FIG. 2) and a machine room 15 surrounded by an engine hood 13 and a counterweight 14 is included at a rear part.

A radiator 20, a cooling fan 21, the engine 1, the generator 3 and the hydraulic pump 2 are placed in this order from a left side in the machine room 15. By a partition wall 18 extensively provided along the radiator 20, an air intake chamber 15a is provided in the machine room 15 at a left side from the radiator 20. When the engine 1 is driven, by rotation of the cooling fan 21, cooling air taken into the air intake chamber 15a from an air intake port 13a provided at an engine hood 13 of the air intake chamber 15a passes through the radiator 20 while performing heat exchange in the radiator 20. Thereafter, cooling air cools the engine 1, the generator 3 and the hydraulic pump 2 and is exhausted from an exhaust port 13b provided at the engine hood 13 of the machine room 15.

A working fluid tank 22, a fuel tank 23 and an operation valve 24 are placed at a right side of the front part of the upper revolving superstructure 10 and the electric motor 7 for revolution is attached at a center part of the upper revolving superstructure 10.

Figure 3:
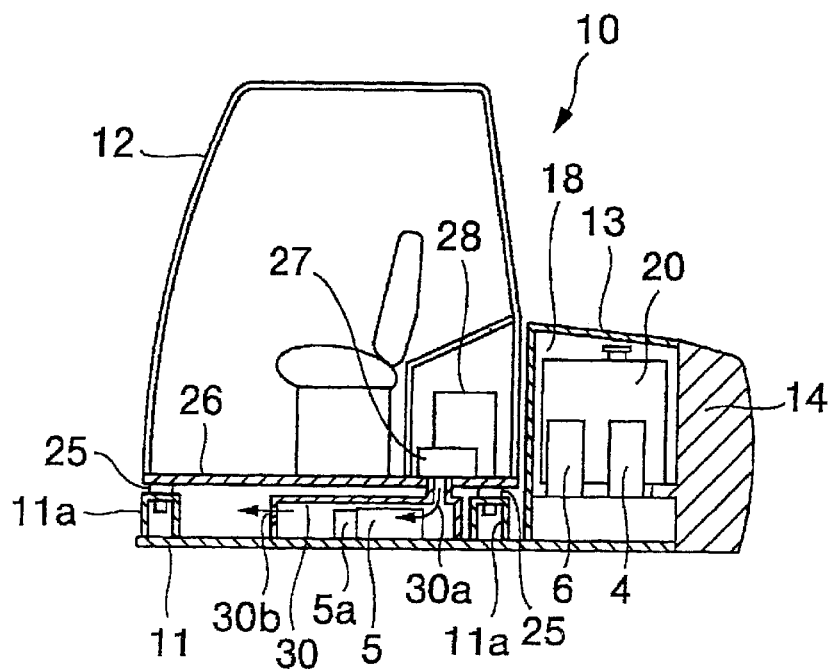
FIG. 3 is a side view showing apparatus arrangement of a hydraulic shovel according to the first embodiment.

As shown in FIG. 3, a floor frame 26 is attached to a bracket 11a of the revolving frame 11 having predetermined height via a rubber mount 25, and the driver's cab 12 is fixed on the floor frame 26. A battery housing chamber 30 is provided inside the revolving frame 11 under the driver's cab 12, and the battery 5 is housed therein. A cooling air inlet port 30a is provided at one side of the battery housing chamber 30, which communicates with an air conditioner 27 for battery temperature control provided at a rear part of the driver's cab 12. A cooling air outlet port 30b is provided at the other side of the battery housing chamber 30. The battery 5 includes a battery controller 5a for performing control of electric charge and discharge and cooling command control for the air conditioner 27. 28 denotes an air conditioner for the driver's cab 12. Further, the inverters 4 and 6 are placed in the air intake chamber 15a.

The battery housing chamber 30 is provided inside the revolving frame 11 under the driver's cab 12, which is the place isolated from the heat generating units such as the engine 1, the generator 3, the electric motor 7, the hydraulic pump 2 and the like, and the battery 5 susceptible to heat is housed in the battery housing chamber 30, therefore making the battery 5 hard to have high temperature. When the temperature of the battery 5 becomes high, the battery controller 5a detects it and outputs a cooling command to the air conditioner 27, and cooling air is introduced into the battery housing chamber 30 from the cooling air inlet port 30a, whereby the battery 5 can be cooled. Thus, the battery 5 can be maintained at suitable temperature and the performance of the battery 5 can be sufficiently exhibited.

Similarly to the battery 5, the inverters 4 and 6 are susceptible to heat, and when they have high temperature, they stop output to prevent breakage of elements. However, in the first embodiment, the inverters 4 and 6 are placed in the air intake chamber 15a, and therefore they are cooled by cooling air and prevented from having high temperature. As a result, the drive of the electric motor 7 for revolution and the assist drive of the generator 3 by the inverters 4 and 6 can be surely controlled. Further, since the battery 5 and the inverters 4 and 6 are placed around the driver's cab, wiring connecting one another becomes short and the wiring connecting to a vehicle controller attached inside the driver's cab becomes short, thus facilitating the assembly.

Next, a second embodiment will be explained with reference to FIG. 4 and FIG. 5. The same components as in the first embodiment are given the same numerals and symbols and the duplicate explanation will be omitted.

Figure 4:
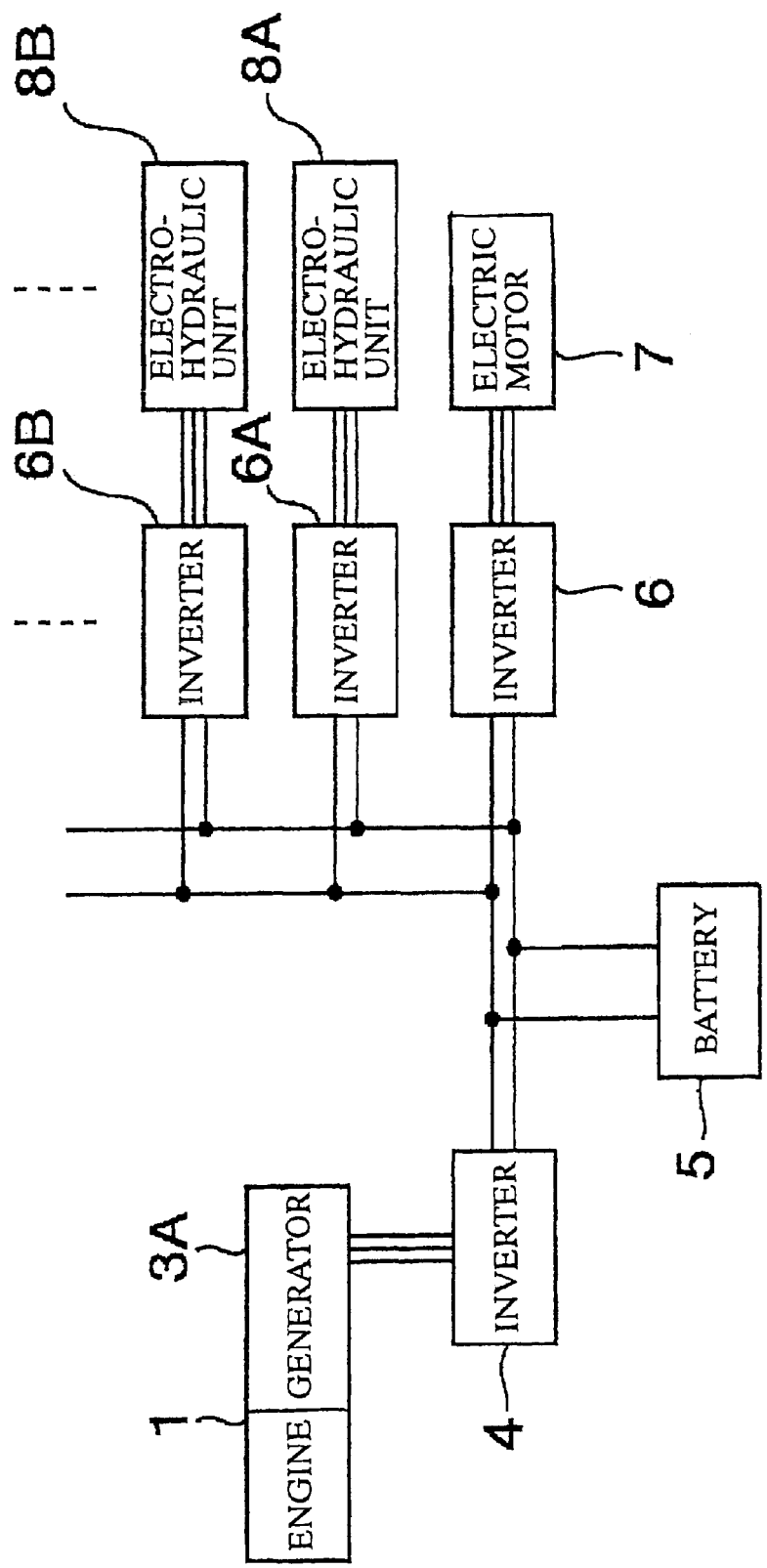
FIG. 4 is a block diagram of an essential part of a hybrid system of a hydraulic shovel according to a second embodiment of the present invention.

FIG. 4 is a block diagram of an essential part of a hybrid system of a hydraulic shovel in the second embodiment. A generator 3A connected to the engine 1 is connected to the battery 5 via the inverter 4. The battery 5 is connected to the electric motor 7 for revolution via the inverter 6 as in the first embodiment and is connected to electro-hydraulic units 8A, 8B, . . . via inverters 6A, 6B, . . . . The electro-hydraulic units 8A, 8B, . . . include hydraulic circuits including operation valves, electric motors and hydraulic pumps connected to the electric motors, and are each provided in correspondence to each hydraulic actuator for driving the working machine of the hydraulic shovel to drive the corresponding hydraulic actuator.

The engine 1 during operation drives at rated rotation and drives the generator 3A to generate electric power and charge the battery 5 via the inverter 4. The inverters 6A, 6B, . . . control drive of the electric motor 7 for revolution and the electro-hydraulic units 8A, 8B, . . . by the charged electric power to perform an operation. In addition to the "energy regeneration at the time of braking of revolution" in the first embodiment, the inverter 6A drives the generator of the electro-hydraulic unit 8A via the hydraulic pump (at this time, operated as a hydraulic motor) of the electro-hydraulic unit 8A by return oil from the hydraulic actuator (boom cylinder) to generate electric power and charge the battery 5 with it, for example, at the time when the boom of the working machine is lowered (energy regeneration at the time of lowering the boom).

Figure 5:
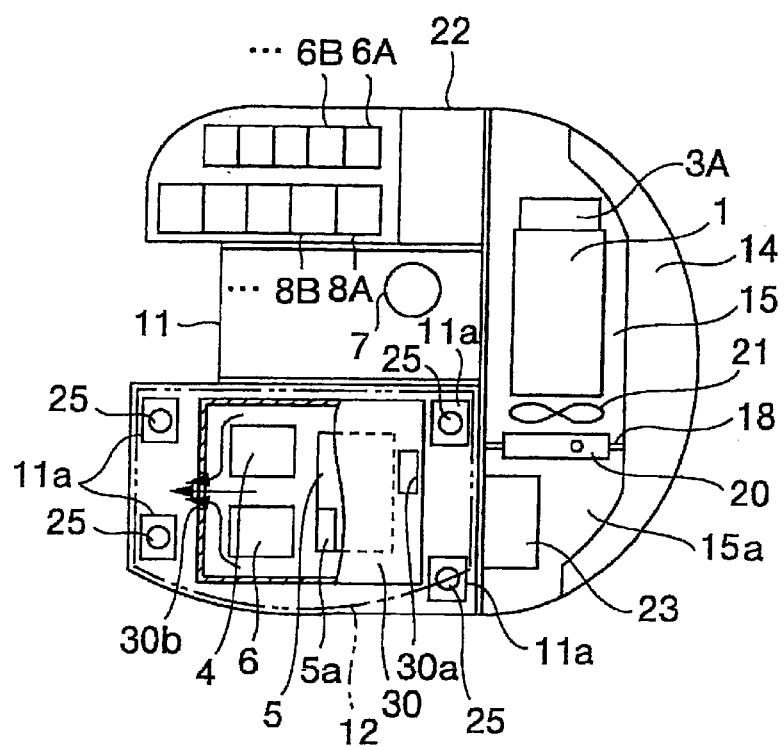
FIG. 5 is a plan view showing apparatus arrangement of a hydraulic shovel according to the second embodiment.

As shown in FIG. 5, the radiator 20, the cooling fan 21, the engine 1, and the generator 3A are placed in this order from the left side of the machine room 15. The working fluid tank 22, inverters 6A, 6B, . . . and the electro-hydraulic units 8A, 8B, . . . are placed at the right side of the front part of the upper revolving superstructure 10, and the electric motor 7 for revolution is attached at the center part of the upper revolving superstructure 10. The fuel tank 23 is placed in the air intake chamber 15a. The battery housing chamber 30 including the cooling air inlet port 30a and the cooling air outlet port 30b is provided in the revolving frame 11 under the driver's cab 12 as in the first embodiment, and the battery 5 and the inverters 4 and 6 are housed in the battery housing chamber 30.

The battery 5 and the inverters 4 and 6 susceptible to heat are isolated from the engine 1, the generator 3A, the electric motor 7 and the like being the heating units, and are housed in the battery housing chamber 30 freely cooled by the air conditioner 27, thus making it possible to maintain the above-described apparatuses at suitable temperature. As a result, the performance of the above-described apparatuses can be sufficiently exhibited. Further, since the fuel tank 23 is placed in the air intake chamber 15a near the engine 1, a fuel pipe line can be shortened, and assembly is facilitated. The engine related apparatuses and the like can be placed in the machine room 15, and thus it is possible to correspond to modularization of the machine room.

Similarly, the working fluid tank 22 is placed at the right side of the front part of the upper revolving superstructure 10 near the operation valve (included in the electro-hydraulic unit 8A, 8B, . . . in the second embodiment), thus making it possible to shorten the drain pipe line and facilitate assembly. In the second embodiment, the electro-hydraulic units 8A, 8B, . . . include the hydraulic pumps, thus making it possible to shorten a suction pipe line and facilitate assembly. The oil pressure related apparatuses and the like are gathered and placed, thus making it possible to correspond to modularization of the oil pressure related apparatuses and the like.

By modularization according to the functions described above, assembly and inspection for each module is made possible, and by combining the modules of different specifications, it is made possible to correspond to many specifications of construction equipment.

The present invention is not limited to the above-described embodiment, but changes and corrections may be added thereto within the scope of the present invention. For example, it may be constituted so that cooling air of the driver's cab 12 is sent to the battery housing chamber 30 by only a fan instead of the air conditioner 27 for controlling battery temperature. The explanation is made with the example having only one battery 5, but a plurality of the batteries 5 may be used depending on the specification of the vehicle and the capacity of the battery. Further, in the first embodiment, the explanation is made with the example in which the inverters 4 and 6 placed in the air intake chamber 15a are cooled by cooling air, but it may be constituted so that the inverter is covered with a water jacket and is forcibly cooled by water and the radiator 20 is utilized for cooling the cooling water fed thereto. In this case, the inverter may be placed in the machine room 15.

Figure 6:
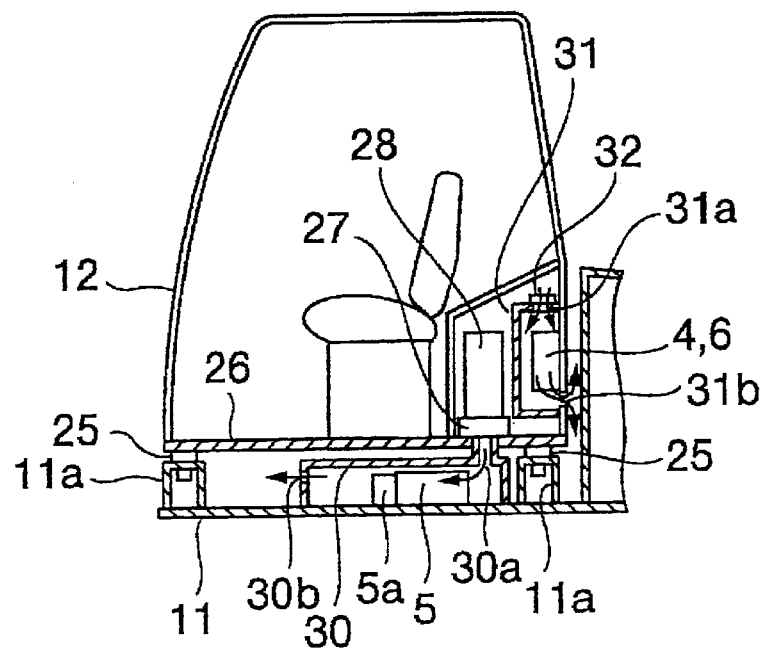
FIG. 6 is a side view showing apparatus arrangement of a hydraulic shovel according to another embodiment of the present invention.
Figure 7:
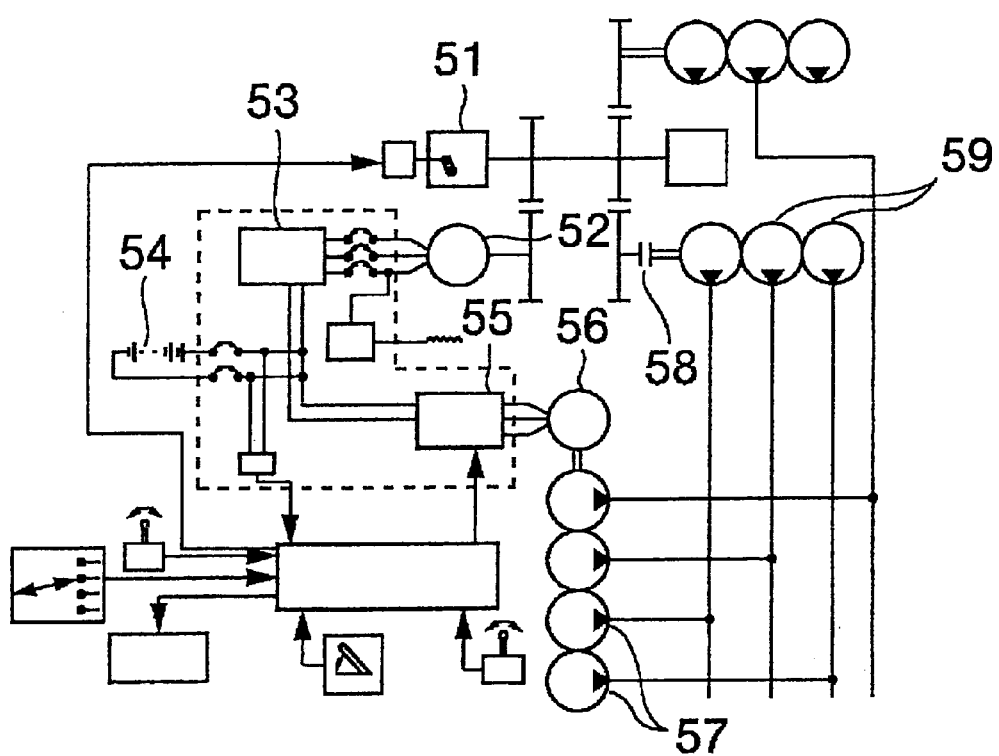
FIG. 7 is a block diagram of a working machine of a prior art.

As shown in FIG. 6, an inverter housing chamber 31 is provided at the rear part of the driver's cab 12, and the inverters 4 and 6 may be housed therein. In this case, as shown in FIG. 6, it is desirable to provide a cooling air inlet port 31a, a cooling air outlet port 31b and a fan 32.

Further, as a hybrid system of construction equipment, the systems shown in FIG. 1 and FIG. 4 are cited as examples, but it goes without saying that the present invention is applicable to other types of hybrid construction equipment including an engine, a generator driven by the engine, a battery charged with electric power generated thereby, an electric motor driven by electric power of the battery, and an inverter for controlling the drive of the electric motor.

As explained thus far, according to the present invention, the fuel tank is placed near the engine and the working fluid tank is placed near the operation valve, which is the strategic arrangement, thus making it possible to shorten pipe lines and the like, facilitate the assembly, and correspond to modularization according to the functions.

Further, the battery housing chamber is provided in the revolving frame under the driver's cab, which is the place isolated from the heating units such as the engine and the like, and the battery susceptible to high temperature and requiring temperature control is housed therein so that it can be freely cooled by the air conditioner, thus making it possible to maintain the battery at suitable temperature. As a result, the performance of the battery can be sufficiently exhibited.

Further, the inverter susceptible to high temperature as the battery is isolated from the heating units such as the engine and the like to be placed at the place which can be cooled by cooling air, thus making it possible to maintain the inverter at suitable temperature. As a result, the performance of the inverter can be sufficiently exhibited.

What is claimed is:

1. Hybrid construction equipment comprising:
   on an upper revolving superstructure rotatably placed on a lower traveling unit,
   an engine;
   a generator driven by said engine;
   a battery charged with electric power generated by said generator;
   an electric motor driven by electric power of said battery;
   an inverter for controlling drive of said electric motor; and
   a driver's cab, wherein said battery is placed to be isolated from said engine and said generator, wherein said battery is placed inside an upper revolving superstructure frame under said driver's cab.

2. The hybrid construction equipment according to claim 1, wherein said engine, said generator and a fuel tank are placed in a machine room at a rear part of said upper revolving superstructure, and wherein a working fluid tank and an operation valve for operating a hydraulic pump driven by said engine are placed at a right side of a front part of said upper revolving superstructure.

3. The hybrid construction equipment according to claim 2, wherein a battery housing chamber, which includes a cooling air inlet port communicating with said driver's cab and a cooling air outlet port, is provided inside said upper revolving superstructure frame, and wherein said battery is housed in said battery housing chamber.

4. Hybrid construction equipment comprising:

on an upper revolving superstructure rotatably placed on a lower traveling unit, an engine;

a generator driven by said engine;

a battery charged with electric power generated by said generator;

an electric motor driven by electric power of said battery;

an inverter for controlling drive of said electric motor; and a driver's cab, wherein said battery is placed to be isolated from said engine and said generator, wherein a battery housing chamber, which includes a cooling air inlet port communicating with said driver's cab and a cooling air outlet port, is provided inside an upper revolving superstructure frame under said driver's cab, and wherein said battery is housed in said battery housing chamber.

5. The hybrid construction equipment according to claim 1, wherein a battery housing chamber, which includes a cooling air inlet port communicating with said driver's cab and a cooling air outlet port, is provided inside said upper revolving superstructure frame, and wherein said battery is housed in said battery housing chamber.

6. The hybrid construction equipment according to any one of claim 1, claim 4 and claim 5, further comprising:

an air intake chamber communicating with a radiator, in a machine room at a rear part of said upper revolving superstructure, wherein said inverter is housed in said air intake chamber.

7. The hybrid construction equipment according to claim 2 or claim 3, further comprising:

an air intake chamber communicating with a radiator, in said machine room, wherein said inverter is housed in said air intake chamber.

8. The hybrid construction equipment according to any one of claim 1, claim 2, claim 4, claim 5 and claim 3, further comprising:

an inverter housing chamber at a rear part of said driver's cab, wherein said inverter is housed in said inverter housing chamber.

9. The hybrid construction equipment according to any one of claim 4, claim 5 and Claim 3, wherein said inverter is housed in said battery housing chamber.

10. Hybrid construction equipment, comprising:

on an upper revolving superstructure rotatably placed on a lower traveling unit, an engine;

a generator driven by said engine;

a battery charged with electric power generated by said generator;

an electric motor driven by electric power of said battery;

an inverter for controlling drive of said electric motor;

a driver's cab; and an air intake chamber communicating with a radiator, in a machine room at a rear part of said upper revolving superstructure, wherein said battery is placed to be isolated from said engine and said generator and said inverter is housed in said air intake chamber.

11. Hybrid construction equipment, comprising:

on an upper revolving superstructure rotatably placed on a lower traveling unit, an engine;

a generator driven by said engine;

a battery charged with electric power generated by said generator;

an electric motor driven by electric power of said battery;

an inverter for controlling drive of said electric motor; and a driver's cab; and an inverter housing chamber at a rear part of said driver's cab, wherein said battery is placed to be isolated from said engine and said generator and said inverter is housed in said inverter housing chamber.

* * * * *